(12) United States Patent
Aota et al.

(10) Patent No.: US 7,777,382 B2
(45) Date of Patent: *Aug. 17, 2010

(54) MOTOR (75) Inventors: Keiji Aota, Kusatsu (JP); Kiyotaka Nishijima, Kusatsu (JP); Akio Yamagiwa, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/428,561

(22) Filed: Apr. 23, 2009

(65) Prior Publication Data
US 2009/0206691 A1 Aug. 20, 2009

Related U.S. Application Data (63) Continuation of application No. 10/562,915, filed as application No. PCT/JP2004/009887 on Jul. 5, 2004, now Pat. No. 7,579,733.

(30) Foreign Application Priority Data

Jul. 4, 2003 (JP) .............................. 2003-191594

(51) Int. Cl.
H02K 5/24 (2006.01)
(52) U.S. Cl. .......................... 310/156.53; 310/156.01; 310/156.56; 310/156.57
(58) Field of Classification Search ............ 310/156.57, 310/156.53, 156.56, 156.01
See application file for complete search history.

(56) References Cited

U.S. PATENT DOCUMENTS

| 5,260,620 | A |   | 11/1993 | Morrill |
|---|---|---|---|---|
| 6,008,559 | A | * | 12/1999 | Asano et al. ........... 310/156.53 |
| 6,031,311 | A |   | 2/2000 | Lee |
| 6,104,117 | A |   | 8/2000 | Nakamura et al. |
| 6,144,132 | A | * | 11/2000 | Nashiki ................. 310/156.55 |
| 6,218,753 | B1 |   | 4/2001 | Asano et al. |
| 6,462,452 | B2 |   | 10/2002 | Nakano et al. |
| 6,853,105 | B2 |   | 2/2005 | Nakano et al. |
| 6,876,116 | B2 |   | 4/2005 | Nakano et al. |
| 6,972,503 | B2 |   | 12/2005 | Hasumi |

(Continued)

FOREIGN PATENT DOCUMENTS

JP 10-201147 A 7/1998

(Continued)

*Primary Examiner*—Quyen Leung
*Assistant Examiner*—Naishadh N Desai
(74) *Attorney, Agent, or Firm*—Global IP Counselors (57) ABSTRACT

A motor includes a rotor core, permanent magnets and non-magnetic layers. The permanent magnets are embedded in the rotor core with each of the permanent magnets defining a pole of the rotor having a pole center and a peripheral edge section, with the peripheral edge section located in a vicinity between the poles and a vicinity of the rotor surface. The non-magnetic layers are located in a vicinity of the rotor surface at a pole center side position with respect to the peripheral edge section of each of the permanent magnets. The peripheral edge sections and the non-magnetic layers are positioned to cancel 5-th or 7-th order harmonics of an induction voltage. The poles are disposed at every approximately constant interval, varying in a constant angle. The peripheral edge sections and the non-magnetic layers are independent from one another, and the rotor core is interposed between them.

14 Claims, 10 Drawing Sheets

U.S. PATENT DOCUMENTS

| | | |
|---|---|---|
| 7,119,507 B2 | 10/2006 | Nishijima |
| 7,579,733 B2 * | 8/2009 | Aota et al. ............. 310/156.53 |
| 2002/0171309 A1 | 11/2002 | Wakui et al. |

FOREIGN PATENT DOCUMENTS

| | | |
|---|---|---|
| JP | 11-046464 A | 2/1999 |
| JP | 11-098731 A | 4/1999 |
| JP | 2000-069695 A | 3/2000 |
| JP | 2002-044888 A | 2/2002 |
| JP | 2002-223538 A | 8/2002 |
| JP | 2002-315243 A | 10/2002 |
| JP | 2003-174794 A | 6/2003 |
| KR | 1999-030111 | 4/1999 |
| KR | 2001-0086837 | 9/2001 |

* cited by examiner

MOTOR

CROSS-REFERENCE TO RELATED APPLICATIONS

This application is a continuation application of U.S. patent application Ser. No. 10/562,915 filed on Sep. 30, 2005. The entire disclosure of U.S. patent application Ser. No. 10/562,915 is hereby incorporated herein by reference. U.S. National stage application Ser. No. 10/562,915 and this application claim priority under 35 U.S.C. §119(a) to Japanese Patent Application No. 2003-191594, filed in Japan on Jul. 4, 2003, the entire contents of which are hereby incorporated herein by reference.

BACKGROUND OF THE INVENTION

1. Field of the Invention

The present invention relates to a motor comprising a rotor core in which multiple permanent magnets are embedded. More particularly, the present invention relates to a motor suitable for usage in which silence is required.

2. Background Information

From the past, Silence in a motor is considered. There exist many techniques which intend to achieve silence by paying attention to the variation in attraction force in rotational direction due to rotational position such as cogging torque, mainly.

For example, Japanese Patent Publication Nos. 10-201147, 11-98731, and 2000-69695 each intends to reduce cogging torque.

Figure 1:
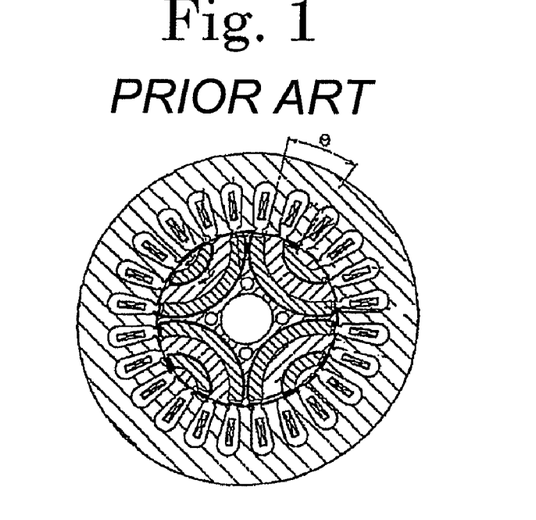
FIG. 1 is a schematic diagram illustrating an example of a prior motor.

Japanese Patent Publication No. 10-201147 realizes a motor with low vibration and low noise by reducing cogging torque by determining circumferential direction target position of permanent magnets in two layers to be a specific relationship which suits to a specific formula, the permanent magnets being embedded in the interior of the rotor core, as illustrated in FIG. 1.

Japanese Patent Publication No. 10-201147 pays attention to cogging torque, so that formula differs depending upon the cycle of cogging torque. Especially, the value of θ in FIG. 1 becomes greater when concentrated winding is employed, so that disadvantage arises in that permanent magnets disposed in outer peripheral side of the rotor cannot be made greater.

Further, an angle of aperture of a magnetic pole differs for every pole, so that unbalance is generated in rotational force. And, an induction voltage waveform becomes asymmetrical shape. Therefore, various abuse are expected such that increase in noise, affection in position detection accuracy and the like due to other cause.

Figure 2:
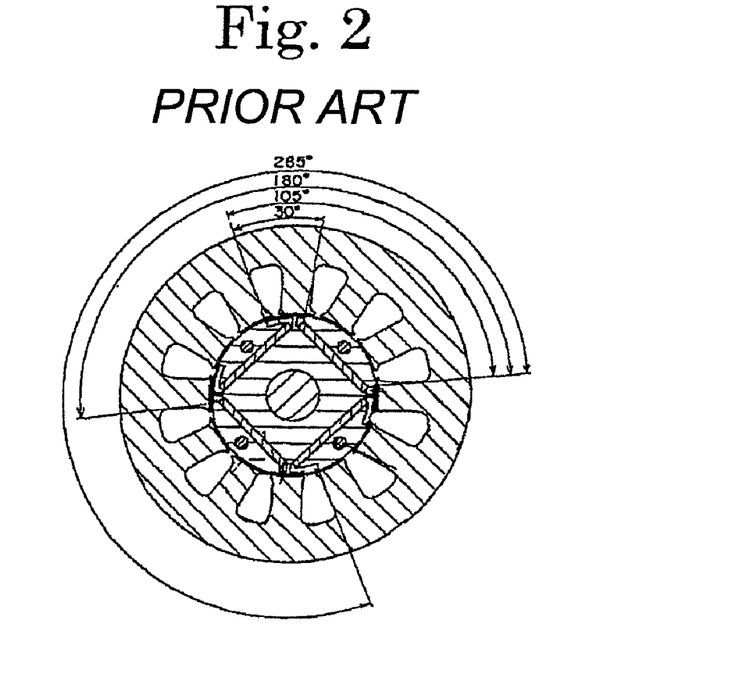
FIG. 2 is a schematic diagram illustrating another example of a prior motor.
Figure 3:
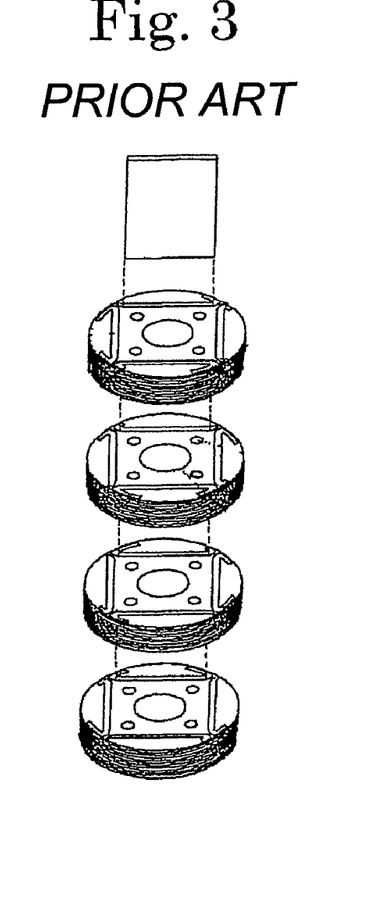
FIG. 3 is a schematic diagram illustrating a further example of a prior motor.

Japanese Patent Publication No. 11-98731 intends to reduce cogging torque by varying the angle of aperture of the magnetic pole for every pole, as illustrated in FIG. 2.

But, an angle of aperture of a magnetic pole differs for every pole, so that unbalance is generated in rotational force. And, an induction voltage waveform becomes asymmetrical shape. Therefore, various abuse are expected such that increase in noise, affection in position detection accuracy and the like due to other cause.

Japanese Patent Publication No. 2000-69695 determines the punching holes for embedding permanent magnet which are equal to one another, and varies the shape of elongate hole section each provided to contact to the edge face of the permanent magnet. This corresponds to application of pseudo skew, and intends to reduction effect in cogging torque.

Piling different rotor cores in axial direction causes complicated arrangement of die. Force is generated in axial direction so that thrust vibration is possibly induced. Abuse cannot be ignored due to existence of pole which has extremely narrow angle of aperture in magnetic pole. For example, problems are exemplified such that increase in iron losses due to excessive concentration of magnetic flux, sufficient magnetic flux cannot reach edge section of permanent magnet during magnetization.

All of those techniques pay attention to cogging torque. When a motor is driven, more particularly when load is great, affection of cogging torque is small, and rather, affection of higher harmonics of induction voltage becomes greater if cogging torque is suppressed below a certain value. More particularly, when permanent magnet having stronger magnetic force is employed such as rare earth magnet, it is understood that the magnet is greatly affected by higher harmonics of induction voltage.

Figure 4:
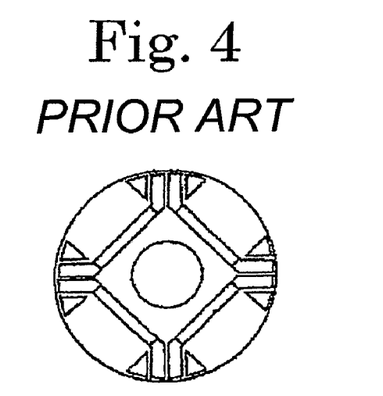
FIG. 4 is a schematic diagram illustrating a further example of a prior motor.

Japanese Patent Publication No. 2002-44888 can resolve the problem of the existence of extremely narrow angle of aperture in magnetic pole among the above problems. Specifically, an elongate hole section provided for contacting the edge face of the permanent magnet is divided in peripheral direction, as illustrated in FIG. 4, so that "auxiliary reinforcement rib" is provided. Japanese Patent Publication No. 2002-44888 intends to prevent deformation in the rotor.

The magnetic flux also flows through the "auxiliary reinforcement rib". Therefore, sound may be increased depending upon the position of the "auxiliary reinforcement rib".

As is described in the above, Japanese Patent Publication Nos. 10-201147, 11-98731, 2000-69695, and 2002-44888 do not successfully reduce cogging torque while sufficient permanent magnet magnetic flux is maintained and abuse in sound due to unbalance vibration and in sound due to thrust force is not generated. Also, they are not the measure which pays attention to specific harmonics of the induction voltage, for example fifth order harmonics and seventh order harmonics. Especially, they are not the arrangement for sufficiently reduce sound when the motor has a great load.

The present invention was made in view of the above problems.

It is an object of the present invention to provide a motor for reducing specific orders of magnetic flux distribution waveform, for example fifth order and seventh order, and for prevent generation of unnecessary radial force and thrust force while sufficient magnetic flux is maintained.

SUMMARY OF THE INVENTION

A motor in accordance with one aspect of the present invention includes a rotor core having a rotor surface, a plurality of permanent magnets and a plurality of non-magnetic layers. The permanent magnets are embedded in the rotor core with each of the permanent magnets defining a pole of the rotor, each pole of the rotor having a pole center and a peripheral edge section, with the peripheral edge section of each of the permanent magnets being located in a vicinity between the poles and a vicinity of the rotor surface. The non-magnetic layers are located in a vicinity of the rotor surface at a pole center side position with respect to the peripheral edge section of each of the permanent magnets. The peripheral edge sections and the non-magnetic layers are positioned to cancel 5-th order harmonics or 7-th order harmonics of an induction voltage. The poles are disposed at every approximately constant interval, varying in a constant angle. The peripheral edge section of each of the permanent magnets and the non-magnetic layers being independent from one another, and the rotor core being interposed between them. An angle θ1 between the peripheral edge section of each of the permanent magnets and a position between the poles, and an angle θ2 between a pole center side edge section in the vicinity of the rotor surface of the non-magnetic layer and the position, are determined to be $$0<θ1<180/(5 \cdot Pn) \text{ and } 180/(5 \cdot Pn) \leq θ2 \leq 180 \times 2/(5 \cdot Pn)$$

or $$0<θ1<180/(7 \cdot Pn) \text{ and } 180/(7 \cdot Pn) \leq θ2 \leq 180 \times 2/(7 \cdot Pn)$$

where a pole pair number is Pn.

A motor in accordance with another aspect of the present invention includes a rotor core having a rotor surface, a plurality of permanent magnets and a plurality of non-magnetic layers. The permanent magnets are embedded in the rotor core with each of the permanent magnets defining a pole of the rotor, each pole of the rotor having a pole center and a peripheral edge section, with the peripheral edge section of each of the permanent magnets being located in a vicinity between the poles and a vicinity of the rotor surface. The non-magnetic layers are located in a vicinity of the rotor surface at a pole center side position with respect to the peripheral edge section of each of the permanent magnets. The peripheral edge sections and the non-magnetic layers are positioned to cancel 5-th order harmonics or 7-th order harmonics of an induction voltage. The poles are disposed at every approximately constant interval, varying in a constant angle. The peripheral edge section of each of the permanent magnets and the non-magnetic layers being independent from one another, and the rotor core being interposed between them. An angle θ5 between the peripheral edge section of each of the permanent magnets and a position between the poles, and an angle θ6 between a pole center side edge section in the vicinity of the rotor surface of non-magnetic layer and the position, are determined to be $$0<θ5<180/(5 \cdot Pn) \text{ and } 180/(5 \cdot Pn) \leq θ6 \leq 180 \times 2/(5 \cdot Pn)$$

where a pole pair number is Pn.

A rotor core section width has points of inflection, with the rotor core section width being sandwiched by the peripheral edge section of each of the permanent magnets and the non-magnetic layers and the rotor surface. Angles θ7 and θ8 between respective points of inflection and the position are determined to be $$0<θ7<180/(7 \cdot Pn) \text{ and } 180/(7 \cdot Pn) \leq θ8 \leq 180 \times 2/(7 \cdot Pn).$$

The a relationship of the angles θ5, θ6, θ7 and θ8 is determined to be θ7<θ5<θ8<θ6.

In this specification "pole" is used to represent N-poles or S-poles which are disposed at every approximately constant interval or constant angle. "magnetic pole" is used to represent an extent from which magnetic flux of the permanent magnet mainly flows. With the present invention, n-th order harmonics component of the magnetic flux distribution waveform (induction voltage waveform) can be reduced and unnecessary radial force and thrust force can be prevented from occurrence, while sufficient magnetic flux can be maintained. Also, mechanical strength can be improved. With the present invention symmetry is taken into consideration. Furthermore, advantages can be realized even when the permanent magnet is divided into multiple parts, some parts corresponding to inner side of the rotor and other parts corresponding to outer side of the rotor. Finally, silencing can be realized with the present invention.

DETAILED DESCRIPTION OF THE PREFERRED EMBODIMENTS

Hereinafter, referring to the attached drawings, we explain a motor of an embodiment according to the present invention in detail.

In the following embodiment, we explain a case which cancels 5-th order harmonics and/or 7-th order harmonics of an induction voltage. But, it is of course possible that other harmonics can be canceled.

First, a general example of a motor is described.

Magnetic flux density distribution in peripheral direction of the rotor surface of the motor is symmetric for every pole. When each pole has approximately same shape to one another, magnetic flux density becomes zero for between poles.

Figure 5:
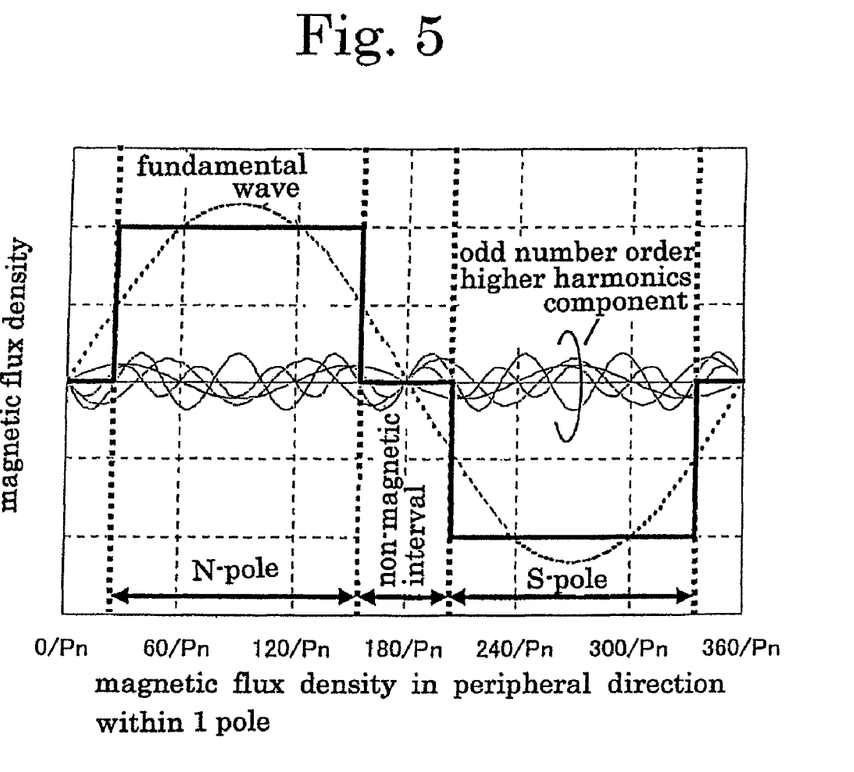
FIG. 5 is a diagram illustrating magnetic flux density distribution in peripheral direction on rotor surface.

Therefore, the magnetic flux density distribution in peripheral direction of the rotor surface becomes a distribution which makes 1 pole pair to be fundamental wave, and includes odd number order thereof. For example, when a simple rectangular wave is applied Fourier expansion, odd number order components such as third order, 5-th order, 7-th order, and 9-th order, are overlapped to the fundamental wave, as is illustrated in FIG. 5. Wherein, 3n-th order harmonics vibration addition forces (where n: 1, 2, 3, 4, . . . ) such as third order and 9-th order harmonics vibration addition forces are in synchronism to one another so that a mode of resonance having a number which is the same to the stator pole number, such that hexagon mode of resonance for the stator having 6 poles. The mode of resonance of higher order generally exceed the audible range greatly so that the mode of resonance hardly becomes noise.

Further, 5-th order and 7-th order have characteristics which is greater in amplitude, easier in becoming sound, and more difficult to be cut-off because of low frequency, in comparison to eleventh or more orders. Therefore, we will pay attention to 5-th order harmonics and 7-th order harmonics.

The following two points may be made to be premises when the 5-th order harmonics and 7-th order harmonics are taken measure to meet with.

1) Every order component becomes zero due to the symmetry of magnetic flux density waveform on the rotor surface.

2) Higher harmonics component can be zero-cross at the location where varying in magnetic flux begins suddenly such as beginning of magnetic pole and the like.

First Embodiment

Hereinafter, the first embodiment is described with reference to the drawings.

Figure 6:
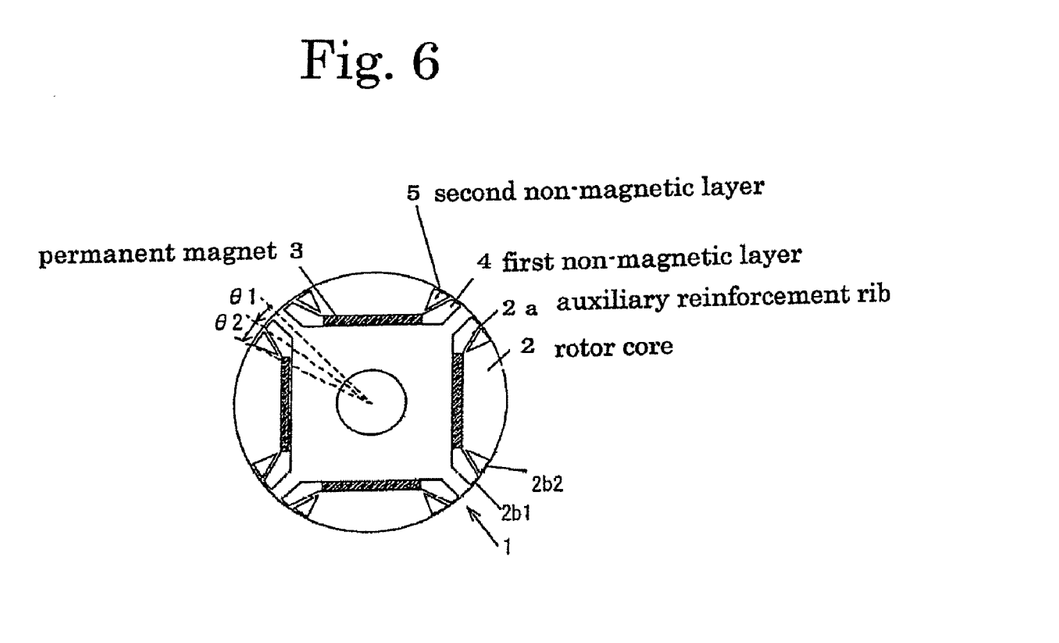
FIG. 6 is a cross-sectional view illustrating a rotor of a motor of first embodiment according to the present invention.

FIG. 6 is a schematic diagram illustrating an arrangement of a rotor of a motor of the first embodiment according to the present invention.

This rotor 1 comprises multiple permanent magnets 3 (in this embodiment, the rotor has 4 poles, therefore 4 permanent magnets 3) which are embedded in the interior of the rotor core 2.

Further, non-magnetic layers 4 (hereinafter, referred to as "first non-magnetic layer"), each being continuous to the peripheral direction edge section of each permanent magnet 3, each elongates in vicinity of the between poles to the vicinity of the rotor surface. And, a second non-magnetic layer 5 is provided at a location which is a pole center side location of the first non-magnetic layer 4 and which is in vicinity of the rotor surface. Wherein, the non-magnetic layer is a through hole or an air layer.

The first non-magnetic layer 4 and second non-magnetic layer 5 are independent from one another. An auxiliary reinforcement rib 2a made of rotor core is interposed between both non-magnetic layers.

An angle $\theta 1$ between the pole center side edge section of rotor surface adjacent section and the between poles of the first non-magnetic layer 4, and an angle $\theta 2$ between the pole center side edge section of rotor surface adjacent section and the between poles of the second non-magnetic layer 5 are determined to be $$0<\theta 1<180/(5 \cdot Pn)$$

and $$180/(5 \cdot Pn) \leq \theta 2 \leq 180 \times 2/(5 \cdot Pn)$$

or $$0<\theta 1<180/(7 \cdot Pn)$$

and $$180/(7 \cdot Pn) \leq \theta 2 \leq 180 \times 2/(7 \cdot Pn)$$

when the pole pair number is Pn. The above formulae correspond to reduction in 5-th order harmonics and reduction in 7-th order harmonics. When the reduction of n-th order harmonics (n is odd number and is equal to or greater than 3) is to be carried out, n is employed instead 5 and 7. Similar operation should be carried out for following formulae.

In this embodiment, the pole pair number Pn=2. Formulae of upper two rows are used for reducing the 5-th order harmonics. Specifically, it is better that $\theta 1=9°$, $\theta 2=18°$.

The principle for reducing sound of the motor having the above arrangement is described in the following.

For example, since 5-th order harmonics is intended to be reduced and the pole pair number is 2, when $\theta 1=0°$, and $\theta 2=18°$, the phases are shifted by 180° so as to cancel from one another. But, $\theta 1=0°$ is difficult for the arrangement where the permanent magnets are embedded in the interior of the rotor core. Consequently, it is sufficient that $\theta 1<18°$ due to symmetry. When 7-th order harmonics is to be reduced, formulae of lower two rows are used, and it is better that $\theta 1<12.9°$, $12.9°\leq\theta 2\leq 25.7°$. For maximizing the torque, $\theta 2$ is increased as great as possible so as to increase the magnetic flux interlinking to the permanent magnet.

Figure 7:
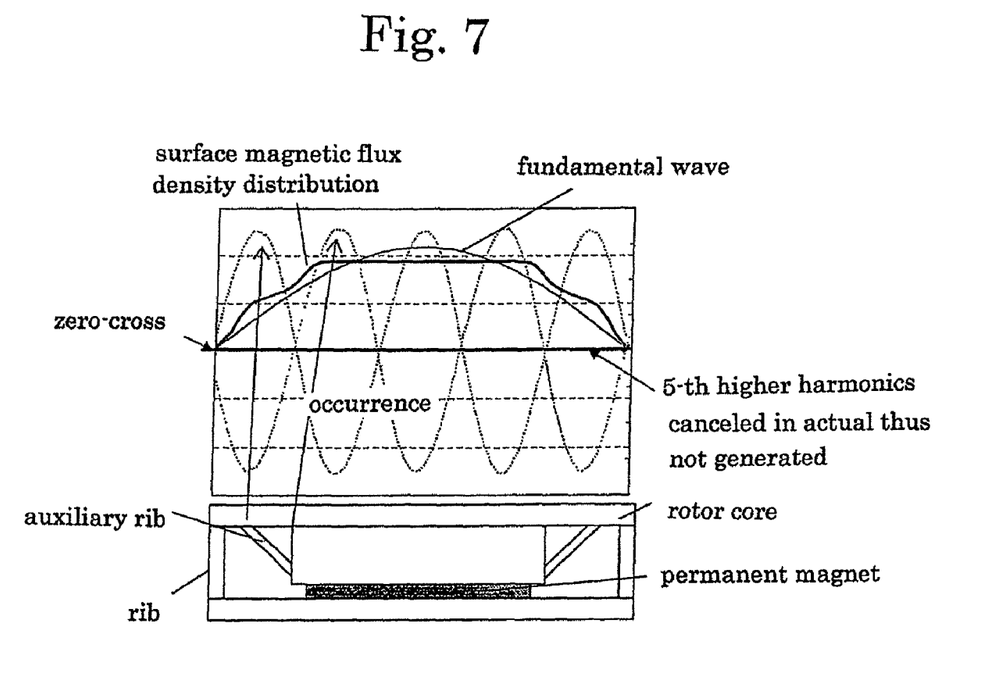
FIG. 7 is a diagram illustrating a relationship between the magnetic flux density distribution on the rotor surface and the non-magnetic layer.

FIG. 7 illustrates a relationship between the magnetic flux density distribution on the rotor surface and the non-magnetic layers 4 and 5, of this embodiment. In some portion of the non-magnetic layers 4 and 5, the magnetic flux density increases or decreases, and in remaining portion of the non-magnetic layers 4 and 5, the magnetic flux density is approximately constant. Therefore, changing in magnetic flux becomes steep from pole center side edge section of the rotor surface adjacent portion of respective non-magnetic layers 4 and 5. Consequently, zero-cross points of higher harmonics components appear for respective points. For the second non-magnetic layer 5, it corresponds to 1 wave length of the 5/7-th order harmonics from the between poles, and it is thought that the zero-cross point becomes the between poles due to symmetry. For the first non-magnetic layer 4, it corresponds to half wave length of the 5/7-th order harmonics from the between poles, and it is thought that the zero-cross point becomes the between poles due to symmetry. Therefore, 5/7-th order harmonics due to respective non-magnetic layers 4 and 5 are shifted by half wave length from one another, so that they are canceled one another.

Figure 8:
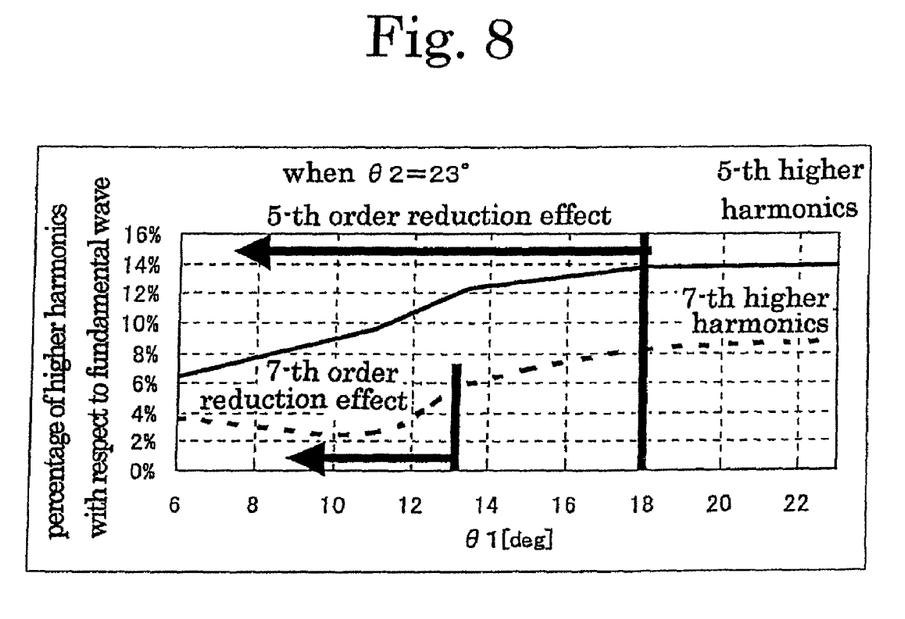
FIG. 8 is a diagram illustrating characteristics of 5-th order harmonics, 7-th order harmonics with respect to θ1 when θ2=23°.
Figure 9:
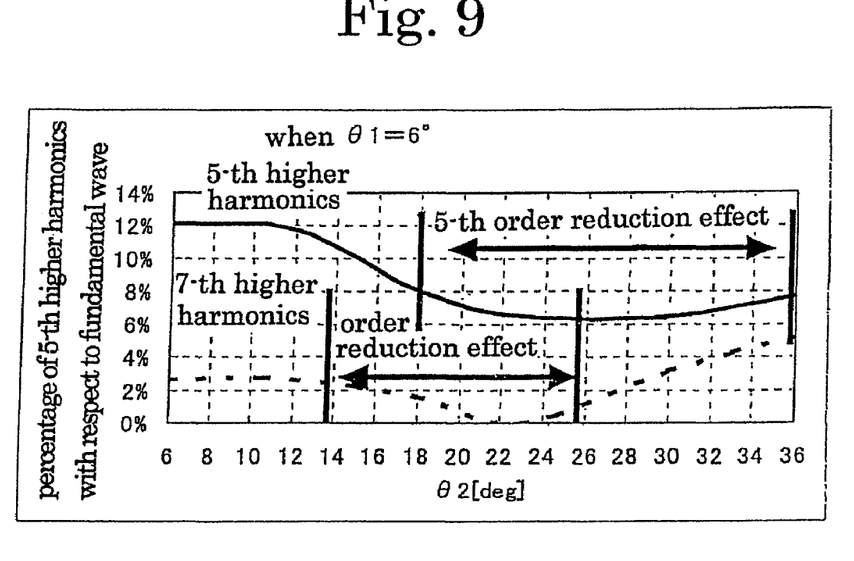
FIG. 9 is a diagram illustrating characteristics of 5-th order harmonics, 7-th order harmonics with respect to θ2 when θ1=6°.

FIG. 8 illustrates characteristics of 5-th order harmonics and 7-th order harmonics with respect to $\theta 1$ when $\theta 2=23°$, while FIG. 9 illustrates characteristics of 5-th order harmonics and 7-th order harmonics with respect to $\theta 2$ when $\theta 1=6°$.

It is understood from FIGS. 8 and 9, greater reduction effect of 5-th order harmonics and 7-th order harmonics can be realized by determining the angle $\theta 1$, and $\theta 2$ to satisfy the above formulae.

Wherein, the width of the rotor core sandwiched by the first non-magnetic layer 4, second non-magnetic layer 5 and the rotor surface (hereinafter, referred to as "first bridge 2b1" and "second bridge 2b2") are constant. It is desirable that the width is made smaller for preventing magnetic flux leakage.

Further, there also exist a rotor rib (auxiliary reinforcement rib) 2a serving as the magnetic path between the first non-magnetic layer 4 and second non-magnetic layer 5. Sufficient effect cannot be obtained by passing the magnetic flux of the permanent magnet through the auxiliary reinforcement rib 2a.

The permanent magnet and non-magnetic layer need not be in continuous to one another. They may adjacent to one another by a short distance.

Figure 10:
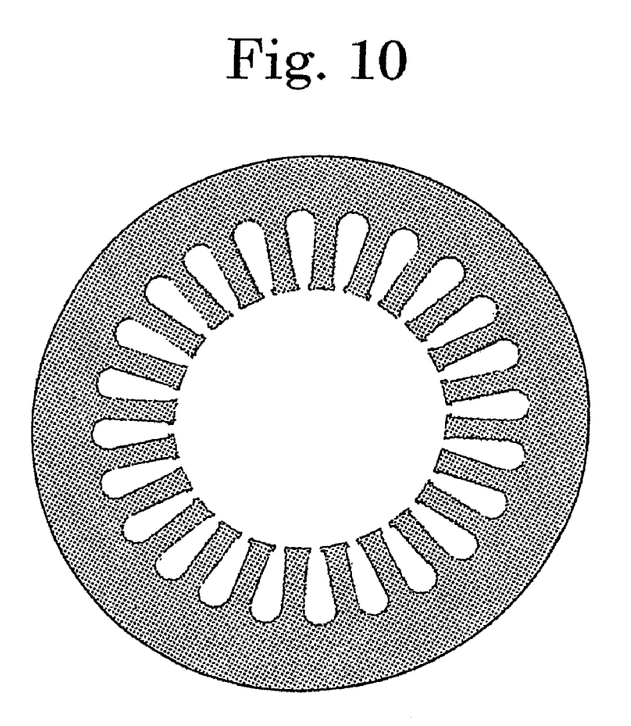
FIG. 10 is a schematic diagram illustrating a stator having distributed winding.
Figure 11:
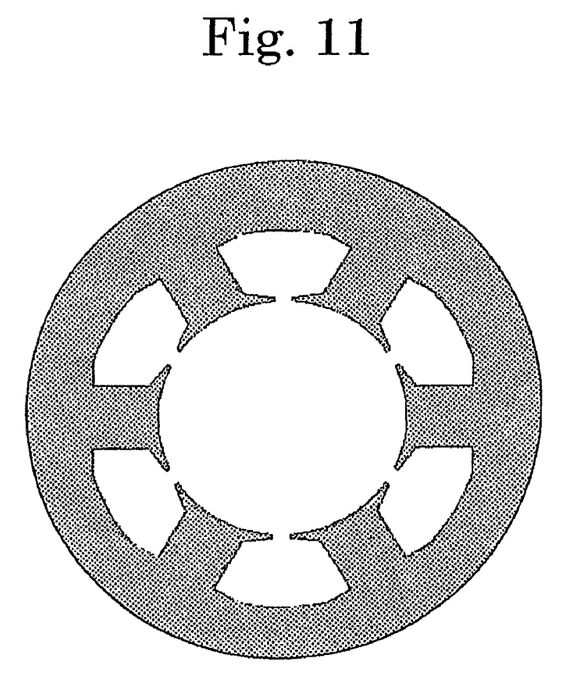
FIG. 11 is a schematic diagram illustrating a stator having concentrated winding.

The stator of the motor according to the present invention may have distributed winding as illustrated in FIG. 10, or may have concentrated winding as illustrated in FIG. 11. Especially, 5-th order harmonics and 7-th order harmonics become extremely greater for concentrated winding, therefore application of the present invention is effective.

Figure 12:
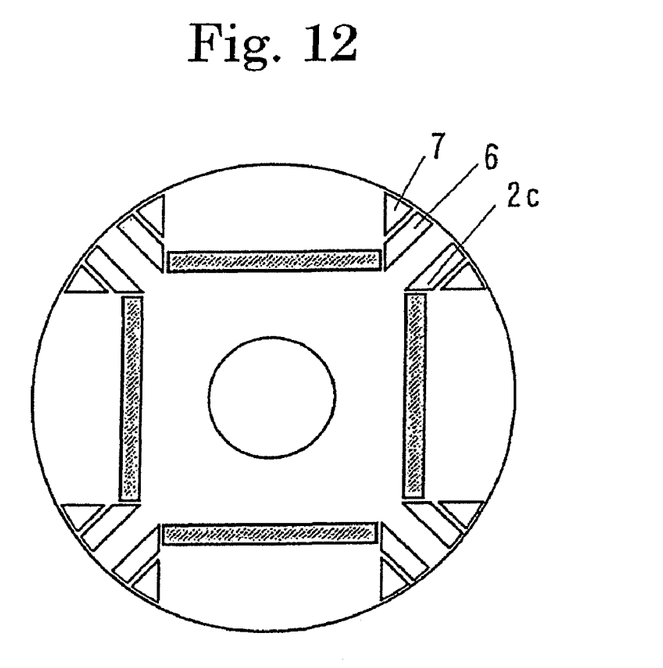
FIG. 12 is a schematic diagram illustrating a modified example of the rotor of first embodiment.
Figure 13:
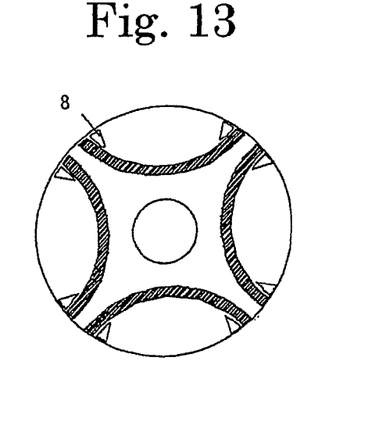
FIG. 13 is a schematic diagram illustrating another modified example of the rotor of first embodiment.

FIGS. 12 and 13 illustrate schematic diagram illustrating modified examples of FIG. 6.

FIG. 12 is a modified example in which rotor core 2c exist in vicinity of both side of the permanent magnet of the rotor of FIG. 6. When the first and second non-magnetic layers 6 and 7 are disposed for canceling the higher harmonics wave of the magnetic flux flowing out from the surface, sufficient effect can be obtained.

FIG. 13 is a modified example in which the permanent magnet layer exist to a region adjacent to the rotor surface. When the second non-magnetic layer 8 is disposed for canceling the higher harmonics wave of the magnetic flux flowing out from the surface, sufficient effect can similarly be obtained. In this case, it is necessary to magnetize the permanent magnet so that the magnet flux at the permanent magnet edge section does not flow out in normal direction of the rotor.

Second Embodiment

Figure 14:
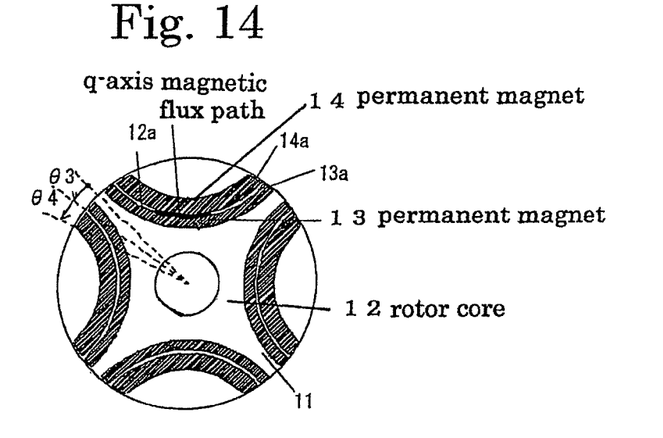
FIG. 14 is a schematic diagram illustrating a rotor of the motor of second embodiment according to the present invention.

FIG. 14 is a schematic diagram illustrating a rotor of a motor of a second embodiment according to the present invention.

In the rotor 11, permanent magnets are embedded in the interior of the rotor core 12. Permanent magnets for each pole is divided into 2 layers in radial direction (13: permanent magnet at inner side of the rotor, and 14: permanent magnet at outer side of the rotor). Further, peripheral direction edge sections 13a, and 14a of each of the permanent magnets 13, and 14 elongate in the vicinity to the between poles to the vicinity of the rotor surface.

The peripheral direction edge sections 13a and 14a of the permanent magnet 13 at inner side of the rotor and of the permanent magnet 14 at outer side of the rotor are independent from one another. A so-called q-axis magnetic flux path 12a made of rotor core is interposed between them.

Due to the existence of the q-axis magnetic flux path 12a, q-axis inductance Lq can be made to be greater so that the reluctance torque can be utilized in greater part, and that the magnetic flux of the permanent magnet can be increased without increasing the rotor in size.

An angle $\theta 3$ between the pole center side edge section of the peripheral direction edge section 13a of the permanent magnet 13 in inner side of the rotor and the between poles, and an angle $\theta 4$ between the pole center side edge section of the peripheral direction edge section 14a of the permanent magnet 14 in inner side of the rotor and the between poles are determined to be $0 < \theta 3 < 180/(5 \cdot Pn)$ and $180/(5 \cdot Pn) \leq \theta 4 \leq 180 \times 2/(5 \cdot Pn)$ or $0 < \theta 3 < 180/(7 \cdot Pn)$ and $180/(7 \cdot Pn) \leq \theta 4 \leq 180 \times 2/(7 \cdot Pn)$ when the pole pair number is Pn.

In this embodiment, the pole pair number Pn=2. Formulae of upper two rows are used for reducing the 5-th order harmonics. Specifically, it is better that $\theta 1 = 9°$, $\theta 2 = 18°$. Of course, formulae of lower two rows are used for reducing the 7-th order harmonics.

The principle for reducing sound of the motor having the above arrangement is similar to that of the first embodiment. Thus the description is omitted.

Figure 15:
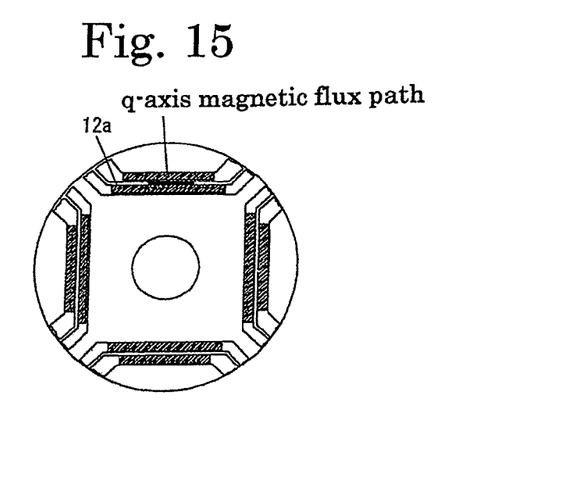
FIG. 15 is a schematic diagram illustrating a modified example of the rotor of second embodiment.

FIG. 15 is a schematic diagram illustrating a modified example of this embodiment.

This modified example employs planar permanent magnets instead the curved permanent magnets.

Therefore, sound can be reduced when this modified example is employed.

Third Embodiment

Figure 16:
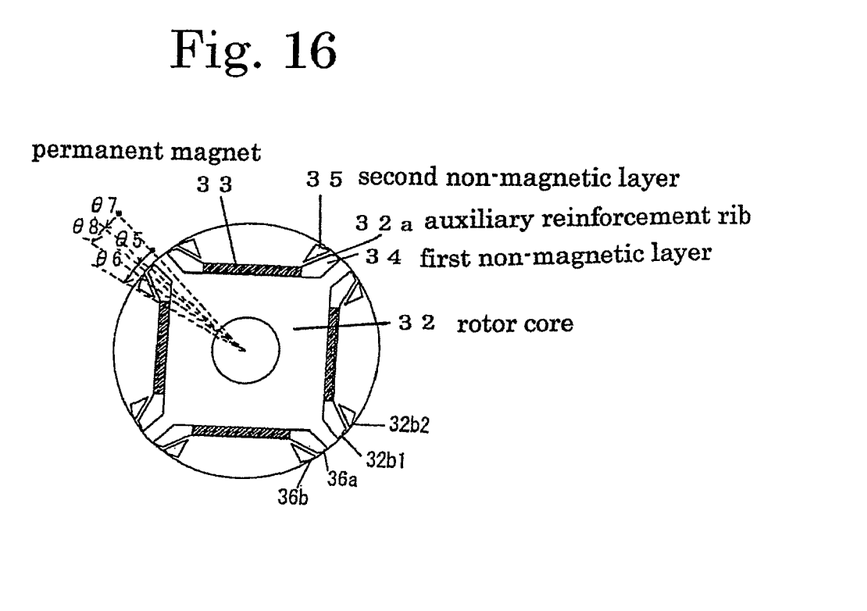
FIG. 16 is a schematic diagram illustrating a rotor of the motor of third embodiment according to the present invention.

FIG. 16 is a schematic diagram illustrating an arrangement of a rotor of a motor of third embodiment according to the present invention.

In the rotor 31, multiple permanent magnets 33 (in this embodiment, the rotor is of 4 poles, so 4 permanent magnets) are embedded in the interior of the rotor core 32.

A non-magnetic layer 34 (hereinafter, referred to as "first non-magnetic layer") elongates in vicinity of between poles to the vicinity of the rotor surface, the non-magnetic layer 34 being continuous to the peripheral direction edge section of each permanent magnet 33. Further, a second non-magnetic layer 35 is provided in pole center side of the first non-magnetic layer 34 and in vicinity of the rotor surface. Wherein, the non-magnetic layer is a through hole or an air layer.

An angle between the pole center side edge section of adjacent section to the rotor surface of the first non-magnetic layer 34 and the between poles is expressed with $\theta 5$, while an angle between the pole center side edge section of adjacent section to the rotor surface of the second non-magnetic layer 35 and the between poles is expressed with $\theta 6$.

The first non-magnetic layer 34 and second non-magnetic layer 35 are independent from one another. An auxiliary reinforcement rib 32a made of rotor core is interposed between them.

Further, the width of the rotor core section (hereinafter, referred to as "first bridge 32b1", and "second bridge 32b2") has points of inflection 36a and 36b, the rotor core section being sandwiched by the first non-magnetic layer 34, second non-magnetic layer 35 and the rotor surface. Angles between respective point of inflection 36a and 36b and between poles are expressed with $\theta 7$ and $\theta 8$. The angles $\theta 5$, $\theta 6$, $\theta 7$ and $\theta 8$ are determined to be $0 < \theta 5 < 180/(5 \cdot Pn)$ and $180/(5 \cdot Pn) \leq \theta 6 \leq 180 \times 2/(5 \cdot Pn)$ and $0 < \theta 7 < 180/(7 \cdot Pn)$ and $$180/(7 \cdot Pn) \leq \theta8 \leq 180 \times 2/(7 \cdot Pn)$$

and $$\theta7 < \theta5 < \theta8 < \theta6.$$

In this embodiment, the pole pair number Pn is 2, so that the angles are determined to be θ6=18°, θ8=12.9°, θ5=9°, θ7=6.4°.

Wherein, the points of inflection 36a and 36b are crossing points of extents where the widths of the first bridge 32b1 and second bridge 32b2 are constant and extents where the widths of the first bridge 32b1 and second bridge 32b2 are gradually increasing. The change in magnetic flux density distribution on the rotor surface becomes steep at these points.

Figure 17:
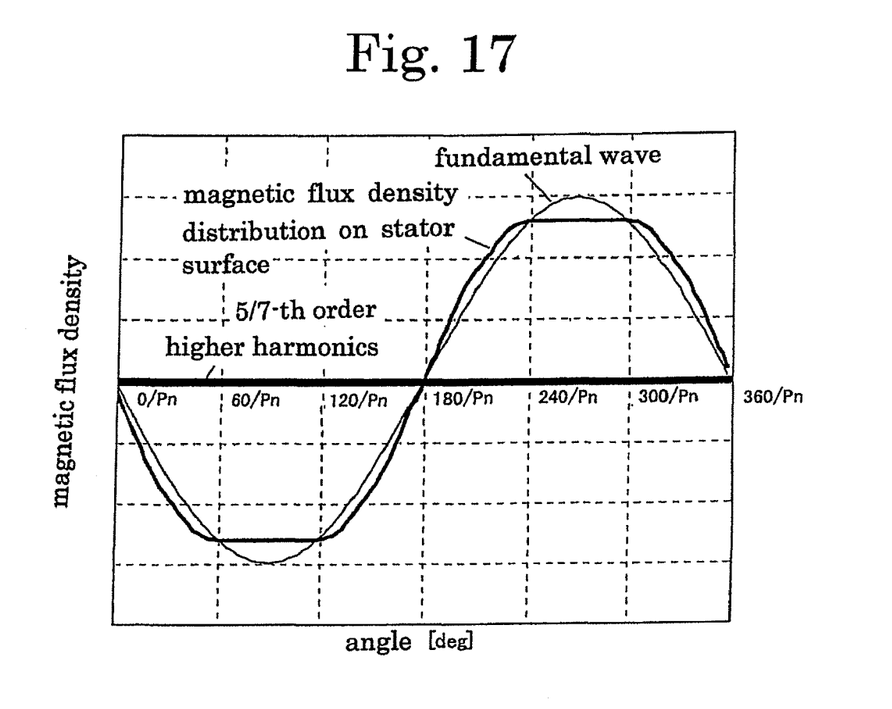
FIG. 17 is a diagram illustrating magnetic flux density distribution on rotor surface.

The magnetic flux density distribution on the rotor surface of this embodiment is illustrated in FIG. 17.

As is apparent from FIG. 17 and the description of the first embodiment, 7-th order harmonics is canceled by the points of inflection 36a and 36b, while 5-th order harmonics is canceled by pole center side edge section of the section adjacent to the rotor surface and by pole center side edge section of the section adjacent to the rotor surface of the second non-magnetic layer 35.

Figure 18:
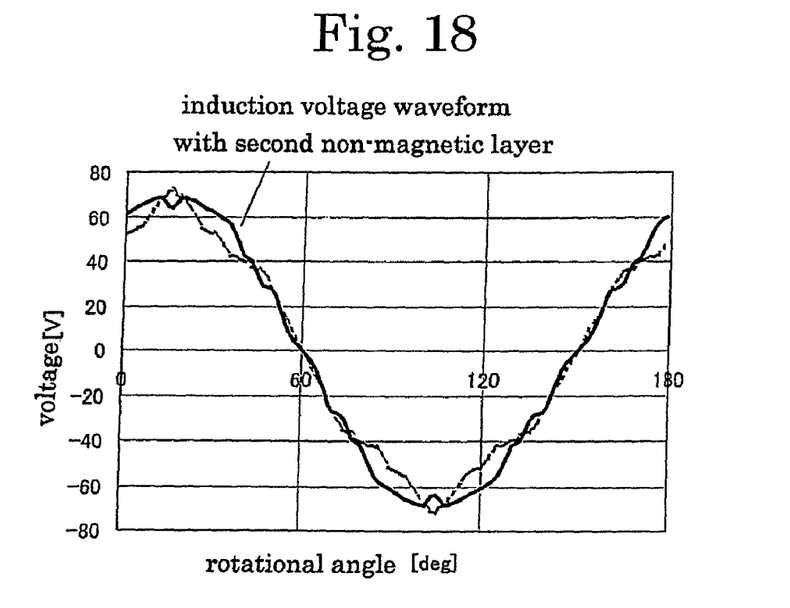
FIG. 18 is a diagram illustrating comparison of the induction voltage waveform for a case where second non-magnetic layer does not exist, and the induction voltage waveform for a case where third embodiment is employed.
Figure 19:
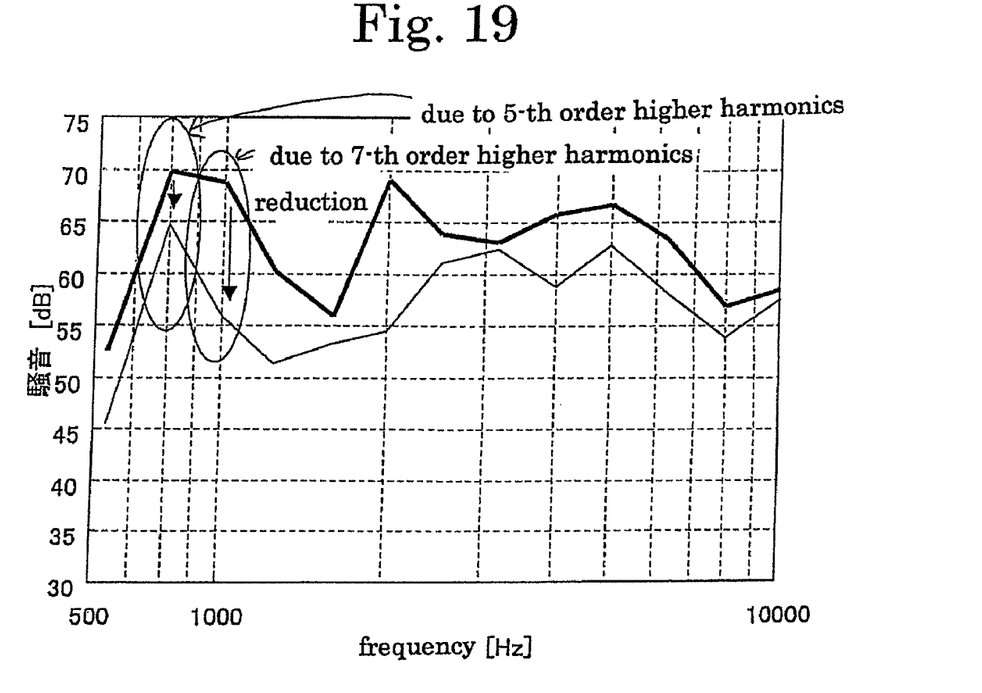
FIG. 19 is a diagram illustrating higher harmonics component of noise for a case the motor is driven as the motor for compressor.

FIG. 18 illustrates a comparison in induction voltage waveforms, one for a case where the second non-magnetic layer 35 does not exist, the other for this embodiment. Table 1 illustrates a comparison in amplitude of higher harmonics components. Further, higher harmonics component of noise when the motor is driven as a motor for compressor is illustrated in FIG. 19.

TABLE 1

| | percentage with respect to fundamental wave | |
|---|---|---|
| Induction voltage | Without non-magnetic layer | With non-magnetic layer |
| 5-th order harmonics | 8.24 | 0.01 |
| 7-th order harmonics | 2.68 | 0.03 |

Figure 20:
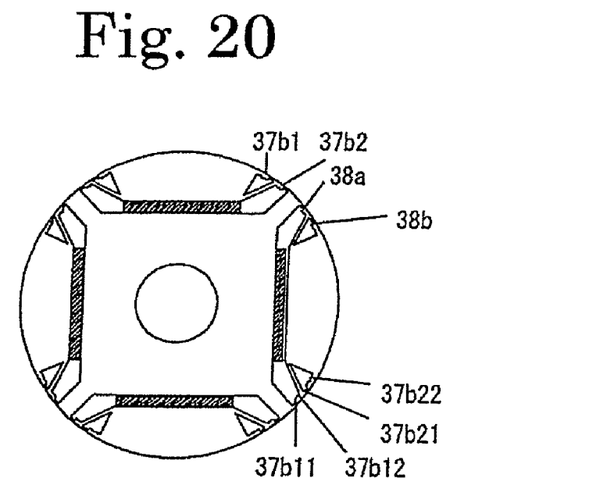
FIG. 20 is a schematic diagram illustrating a modified example of the rotor of third embodiment.

Further, the shapes of the non-magnetic layer 34 and 35 are not limited to the shapes of this embodiment. It may be good that, for example, as is illustrated in FIG. 20, the widths of the bridges 37b1 and 37b2 are separated into small width sections 37b11, 37b21 and large width sections 37b12, 37b22, and that varying points of the small width sections 37b11, 37b21 and the large width sections 37b12, 37b22 are considered to be points of inflection 38a, 38b.

Fourth Embodiment

Figure 21:
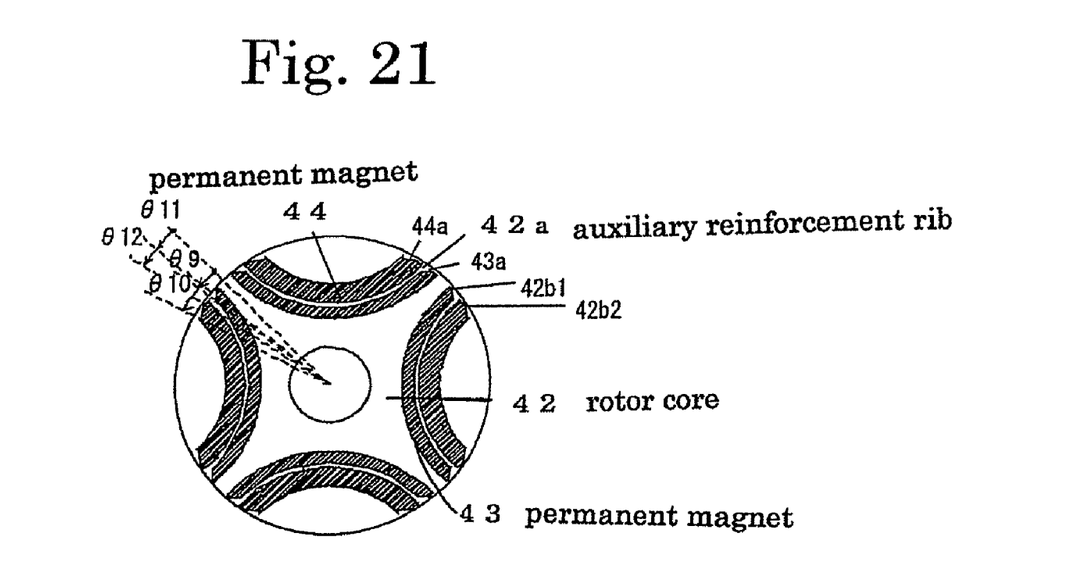
FIG. 21 is a schematic diagram illustrating a rotor of the motor of fourth embodiment according to the present invention.

FIG. 21 is a schematic diagram illustrating an arrangement of a rotor of a motor of fourth embodiment according to the present invention.

In the rotor 41, permanent magnets are embedded in the interior of the rotor core 42. The permanent magnets are divided into two layers in radial direction for every pole (43: permanent magnet at inner side of the rotor, and 44: permanent magnet at outer side of the rotor). Further, the peripheral direction edge section 43a, 44a of each permanent magnet 43, 44 elongates in the vicinity between poles to the vicinity of the rotor surface.

The peripheral direction edge sections 43a, 44a of the permanent magnet 43 at the inner side of the rotor and the permanent magnet 44 at the outer side of the rotor are independent from one another. A so-called q-axis magnetic flux path 42a made of rotor core is interposed between them.

Due to the existence of the q-axis magnetic flux path 42a, the q-axis inductance Lq can be made greater. Therefore, reluctance torque of greater part can be used, and the magnetic flux of the permanent magnet can be increased without increase of the rotor in size.

Further, the peripheral direction edge section 43a of the permanent magnet 43 at the inner side of the rotor elongates in the vicinity between poles to the vicinity of the rotor surface, and the peripheral direction edge section 44a of the permanent magnet 44 at the outer side of the rotor also elongates in the vicinity between poles to the vicinity of the rotor surface. Wherein, air layers and the like may exist at the peripheral direction edge sections 43a, 44a of the permanent magnets 43, 44. An angle between the pole center side edge section of the peripheral direction edge section 43a of the permanent magnet 43 at the inner side of the rotor and between poles is expressed with θ9, and an angle between the pole center side edge section of the peripheral direction edge section 44a of the permanent magnet 44 at the outer side of the rotor and between poles is expressed with θ10.

Further, the width of the rotor core section (hereinafter, referred to as "first bridge 42b1", and "second bridge 42b2") has points of inflection 46a and 46b, the rotor core section being sandwiched by the peripheral direction edge section 43a of the permanent magnet 43 at the inner side of the rotor, the peripheral direction edge section 44a of the permanent magnet 44 at the outer side of the rotor and the rotor surface. Angles between respective point of inflection 46a, 46b and between poles are expressed with θ11 and θ12. The angles θ9, θ10, θ11 and θ12 are determined to be $$0 < \theta9 < 180/(5 \cdot Pn)$$

and $$180/(5 \cdot Pn) \leq \theta10 \leq 180 \times 2/(5 \cdot Pn)$$

and $$0 < \theta11 < 180/(7 \cdot Pn)$$

and $$180/(7 \cdot Pn) \leq \theta12 \leq 180 \times 2/(7 \cdot Pn)$$

and $$\theta11 < \theta9 < \theta12 < \theta10.$$

In this embodiment, the pole pair number Pn is 2, so that the angles are determined to be θ10=18°, θ12=12.9°, θ9=9°, θ11=6.4°.

The sound reduction operation and effect in this embodiment is similar to those of the third embodiment, therefore description is omitted.

What is claimed is:

1. A rotor comprising;
a rotor core having a rotor surface;
a plurality of permanent magnets embedded in the rotor core with each of the permanent magnets defining a pole of the rotor, each pole of the rotor having a pole center and a peripheral edge section, with the peripheral edge section of each of the permanent magnets being located in a vicinity between the poles and a vicinity of the rotor surface; and
a plurality of non-magnetic layers being located in a vicinity of the rotor surface at a pole center side position with respect to the peripheral edge section of each of the permanent magnets, the peripheral edge sections and the non-magnetic layers being positioned to cancel 5-th order harmonics or 7-th order harmonics of an induction voltage, the poles being disposed at every approximately constant interval, varying in a constant angle, the peripheral edge section of each of the permanent magnets and the non-magnetic layers being independent from one another, and the rotor core being interposed between them, and an angle θ1 between the peripheral edge section of each of the permanent magnets and a position between the poles, and an angle θ2 between a pole center side edge section in the vicinity of the rotor surface of the non-magnetic layer and the position, are determined to be $$0<\theta 1<180/(5\cdot Pn) \text{ and } 180/(5\cdot Pn)\leq \theta 2\leq 180\times 2/(5\cdot Pn)$$

or $$0<\theta 1<180/(7\cdot Pn) \text{ and } 180/(7\cdot Pn)\leq \theta 2\leq 180\times 2/(7\cdot Pn)$$

where a pole pair number is Pn.

2. The rotor as set forth in claim 1, wherein the angle θ1 and the angle θ2 satisfy either $$0<\theta 1<180/(5\cdot Pn) \text{ and } \theta 2=180/(5\cdot Pn)$$

or $$0<\theta 1<180/(7\cdot Pn) \text{ and } \theta 2=180/(7\cdot Pn).$$

3. A rotor comprising;

a rotor core having a rotor surface;

a plurality of permanent magnets embedded in the rotor core with each of the permanent magnets defining a pole of the rotor, each pole of the rotor having a pole center and a peripheral edge section, with the peripheral edge section of each of the permanent magnets being located in a vicinity between the poles and a vicinity of the rotor surface; and a plurality of non-magnetic layers being located in a vicinity of the rotor surface at a pole center side position with respect to the peripheral edge section of each of the permanent magnets, the peripheral edge sections and the non-magnetic layers being positioned to cancel 5-th order harmonics or 7-th order harmonics of an induction voltage, the poles being disposed at every approximately constant interval, varying in a constant angle, the peripheral edge section of each of the permanent magnets and the non-magnetic layers being independent from one another, and the rotor core being interposed between them, and an angle θ5 between the peripheral edge section of each of the permanent magnets and a position between the poles, and an angle θ6 between a pole center side edge section in the vicinity of the rotor surface of non-magnetic layer and the position, are determined to be $$0<\theta 5<180/(5\cdot Pn) \text{ and } 180/(5\cdot Pn)\leq \theta 6\leq 180\times 2/(5\cdot Pn)$$

where a pole pair number is Pn, and a rotor core section width has points of inflection, the rotor core section width being sandwiched by the peripheral edge section of each of the permanent magnets and the non-magnetic layers and the rotor surface, angles θ7 and θ8 between respective points of inflection and the position are determined to be $$0<\theta 7<180/(7\cdot Pn) \text{ and } 180/(7\cdot Pn)\leq \theta 8\leq 180\times 2/(7\cdot Pn),$$ and a relationship of the angles θ5, θ6, θ7 and θ8 is determined to be θ7<θ5<θ8<θ6.

4. The rotor as set forth in claim 3, wherein the angle θ5 is 0<θ5<180/(5·Pn), the angle θ7 is 0<θ7<180/(7·Pn), the angle θ6 is 180/(5·Pn), and the angle θ8 is 180/(7·Pn).

5. The rotor as set forth in claim 1, wherein each of the permanent magnets is divided into multiple layers in a radial direction.

6. The rotor as set forth in claim 5, wherein each of the permanent magnets is divided into two layers in a radial direction, and an angle θ3 between the peripheral edge section of the permanent magnet in an inner side of the rotor and a position between the poles, and an angle θ4 between the peripheral edge section of the permanent magnet in an outer side of the rotor and the position are determined to be $$0<\theta 3<180/(5\cdot Pn) \text{ and } 180/(5\cdot Pn)\leq \theta 4\leq 180\times 2/(5\cdot Pn)$$

or $$0<\theta 3<180/(7\cdot Pn) \text{ and } 180/(7\cdot Pn)\leq \theta 4\leq 180\times 2/(7\cdot Pn).$$

7. The rotor as set forth in claim 6, wherein the angle θ3 and the angle θ4 satisfy either $$0<\theta 3<180/(5\cdot Pn) \text{ and } \theta 4=180/(5\cdot Pn)$$

or $$0<\theta 3<180/(7\cdot Pn) \text{ and } \theta 4=180/(7\cdot Pn).$$

8. The rotor as set forth in claim 5, wherein each of the permanent magnets is divided into two layers in a radial direction, and an angle θ9 between a pole center side edge section, in the vicinity of the rotor surface, of the permanent magnet in an inner side of the rotor and a position between the poles, and an angle θ10 between a pole center side edge section, in the vicinity of the rotor surface, of the permanent magnet in an outer side of the rotor and the position are determined to be $$0<\theta 9<180/(5\cdot Pn) \text{ and } 180/(5\cdot Pn)\leq \theta 10\leq 180\times 2/(5\cdot Pn),$$

a rotor core section width has points of inflection, the rotor core section width being sandwiched by the peripheral edge sections of the permanent magnets on the inner side of the rotor and the peripheral edge sections of the permanent magnets on the outer side of the rotor, and angles θ11 and θ12 between respective points of inflection and the position are determined to be $$0<\theta 11<180/(7\cdot Pn) \text{ and } 180/(7\cdot Pn)\leq \theta 12\leq 180\times 2/(7\cdot Pn), \text{ and}$$

a relationship of the angles θ9, θ10, θ11 and θ12 is determined to be θ11<θ9<θ12<θ10.

9. The rotor as set forth in claim 8, wherein the angle θ9 is 0<θ9<180/(5·Pn), the angle θ11 is 0<θ11<180/(7·Pn), the angle θ10 is 180/(5·Pn), and the angle θ12 is 180/(7·Pn).

10. The rotor as set forth in claim 3 wherein each of the permanent magnets is divided into multiple layers in a radial direction.

11. The rotor as set forth in claim 10, wherein each of the permanent magnets is divided into two layers in a radial direction, and an angle θ3 between the peripheral edge section of the permanent magnet in an inner side of the rotor or a pole center side edge section of the rotor surface adjacent each of the first non-magnetic layers and the poles, and an angle θ4 between the peripheral edge section of the permanent magnet in an outer side of the rotor or the pole center side edge section of the rotor surface adjacent each of the first non-magnetic layers and the poles are determined to be $$0<\theta 3<180/(5\cdot Pn) \text{ and } 180/(5\cdot Pn)\leq \theta 4\leq 180\times 2/(5\cdot Pn)$$

or $$0<\theta 3<180/(7\cdot Pn) \text{ and } 180/(7\cdot Pn)\leq \theta 4\leq 180\times 2/(7\cdot Pn).$$

12. The rotor as set forth in claim 11, wherein the angle $\theta 3$ and the angle $\theta 4$ satisfy either $$0<\theta 3<180/(5\cdot Pn) \text{ and } \theta 4=180/(5\cdot Pn)$$

or $$0<\theta 3<180/(7\cdot Pn) \text{ and } \theta 4=180/(7\cdot Pn).$$

13. The rotor as set forth in claim 10, wherein each of the permanent magnets is divided into two layers in a radial direction, and an angle $\theta 9$ between a pole center side edge section, in the vicinity of the rotor surface, of the permanent magnet in an inner side of the rotor and a position between the poles, and an angle $\theta 10$ between a pole center side edge section, in the vicinity of the rotor surface, of the permanent magnet in an outer side of the rotor and the position are determined to be $$0<\theta 9<180/(5\cdot Pn) \text{ and } 180/(5\cdot Pn)\leq \theta 10\leq 180\times 2/(5\cdot Pn),$$

a rotor core section width has points of inflection, the rotor core section width being sandwiched by the peripheral edge sections of the permanent magnets on the inner side of the rotor and the peripheral edge sections of the permanent magnets on the outer side of the rotor, and angles $\theta 11$ and $\theta 12$ between respective points of inflection and the position are determined to be $$0<\theta 11<180/(7\cdot Pn) \text{ and } 180/(7\cdot Pn)\leq \theta 12\leq 180\times 2/(7\cdot Pn), \text{ and}$$

a relationship of the angles $\theta 9$, $\theta 10$, $\theta 11$ and $\theta 12$ is determined to be $\theta 11<\theta 9<\theta 12<\theta 10$.

14. The rotor as set forth in claim 13, wherein the angle $\theta 9$ is $0<\theta 9<180/(5\cdot Pn)$, the angle $\theta 11$ is $0<\theta 11<180/(7\cdot Pn)$, the angle $\theta 10$ is $180/(5\cdot Pn)$, and the angle $\theta 12$ is $180/(7\cdot Pn)$.

* * * * *